United States Patent

[11] 3,616,106

| [72] | Inventor | Hallard C. Moyer |
| | | Homewood, Ill. |
| [21] | Appl. No. | 764,340 |
| [22] | Filed | Oct. 1, 1968 |
| [45] | Patented | Oct. 26, 1971 |
| [73] | Assignee | Sinclair Oil Corporation |
| | | New York, N.Y. |

[54] LAMINATE MADE WITH RESIN AND WAX ADHESIVE MIXTURE
12 Claims, No Drawings

[52] U.S. Cl. ..................................... 161/235,
117/143 A, 117/145, 117/158, 117/167, 156/332, 156/334, 161/249, 161/250, 161/270, 260/28.5 AV

[51] Int. Cl. ..................................... B32b 9/06, C08c 11/70

[50] Field of Search .......................... 161/234, 235; 260/28.5 A, 28.5 AV, 28.5; 156/332, 334; 117/135

[56] References Cited
UNITED STATES PATENTS

| 2,943,069 | 6/1960 | Rosenbaum .................. | 260/23 |
| 3,117,101 | 1/1964 | Moyer ......................... | 260/28 |
| 3,172,801 | 3/1965 | Cantelow ..................... | 260/28.5 |
| 3,181,765 | 5/1965 | Bonzagni et al. ............. | 161/235 |
| 3,306,882 | 2/1967 | Pullen et al. ................. | 260/28.5 |
| 3,396,134 | 8/1968 | Cox ............................. | 260/28.5 |

FOREIGN PATENTS

| 738,023 | 7/1966 | Canada ....................... | 260/28.5 |

*Primary Examiner*—John T. Goolkasian
*Assistant Examiner*—Willard E. Hoag
*Attorney*—McLean, Morton and Boustead ABSTRACT: A wax laminant composition comprising a major amount of high melting paraffinic wax, a minor amount of ethylene-vinyl acetate copolymer, a minor amount of an amorphous copolymer of alpha-methyl styrene and vinyl toluene, and a minor amount of oxidized polyethylene. This wax composition provides a laminant with improved high-temperature laminating strength, viscosity suitable for handling in conventional laminating machines, low oil content (i.e., low straining) and good wetting, flow, and vapor barrier properties.

LAMINATE MADE WITH RESIN AND WAX ADHESIVE MIXTURE

This invention relates to a wax-polymer composition which can be used as a coating or a laminant to provide improved bonding strength at elevated temperatures. Bonding strength is generally lacking in laminating compositions presently employed, particularly those compositions having the qualities of low viscosity and effective vapor barrier properties.

Petroleum waxes have long been used successfully as laminants for combining sheets or plies of various materials, such as microcrystalline wax for laminating combinations of paper, paperboard, glassine and cellophane to make valuable and versatile packaging materials. These laminations are of value for service at or near room temperature, and they also may be serviceable at refrigerated temperatures, if properly designed, and formulated. However, laminations based on the use of microcrystalline wax as the primary component have been excluded or found to be of limited value in uses where service at elevated temperature is important. Microcrystalline waxes which have the most versatility for bonding substrates at room temperature or lower are often rather soft and tacky even at room temperatures. At moderately elevated temperature, e.g. 100°–120° F., the lower melting components in microcrystalline waxes are inclined to bleed into and through a paper substrate, resulting in "staining." Additionally, at such elevated temperatures the wax loses cohesive strength so that the piles of substrates are no longer bonded firmly.

Many efforts have been made in the past to obtain better laminating performance at elevated temperatures, but all of the properties desired have not been obtained. By the use of minor amounts of additives, such as described in U.S. Pat. No. 3,367,897 it is possible to employ harder, higher melting microwax as the primary component of the laminant, thus reducing stain and improving cohesive strength at moderately elevated temperature. But this improvement is not sufficient for more severe types of service where performance must be maintained at even higher temperature, e.g., up to about 130° F. One possible solution is to replace the wax-based laminant with a glue or other adhesive that does not soften in this temperature range. But glue, starch, and other similar adhesives are of little or no value as a moisture barrier, and do not provide a suitable answer where both bonding power and vapor barrier properties are needed. Another possible solution is to add to the laminating wax a sufficient quantity of an appropriate high-polymer additive, such as butyl rubber, in an attempt to impart high temperature laminating strength. But this approach is relatively ineffective, contributing little improvement to hot seal strength while increasing enormously the viscosity and difficulty of handling the composition.

A further method for obtaining better laminating performance at elevated temperature is through the use of blends of wax and ethylene-vinyl acetate (EVA) copolymers. But this approach, by itself, does not provide the desired seal performance while maintaining the desired low viscosity and easy application characteristics. In order to be operable on conventional roll-type wax coating or laminating machines, the permissible viscosity is about 200 centipoises at 250° F. (max.), preferably less than about 150 centipoises at 250° F. Furthermore, viscosity is not the sole criteria as to whether a composition will run on a machine, so in addition to meeting general viscosity requirements, the composition must have good flow and wetting behavior.

The present invention provides wax compositions suitable for use as a coating and as a laminant to provide improved bonding strength at elevated temperatures An advantage of these compositions is that relatively low viscosity can be obtained so that the wax composition can be prepared at economically rapid speeds on standard coating or laminating equipment. These compositions also provide the good vapor barrier qualities desired of coatings or laminants. The relatively good film flexibility, bond strength at low as well as high temperatures, and blend compatibility give the wax compositions of this invention a high degree of practical utility. However, this invention is not limited to compositions having a viscosity of less than 200 c.p.s. at 250° F., since at higher viscosities superior high-temperature seal strength can also be obtained compared to that which is afforded by prior compositions.

It now has been found, in accordance with this invention, that the superior performance herein described can be obtained by using as a laminant or coating, a wax composition consisting essentially of: (a) a high-melting paraffinic wax, melting at about 150° F. or more, having a viscosity at 210° F. of at least about 5.7 c.p.s. and having a needle penetration at 120° F. of up to about 70 dmm. (decimillimeter), preferably up to about 50 dmm. (b) an ethylene-vinyl acetate (EVA) copolymer having a vinyl acetate content of about 25–29 weight percent and an ASTM melt index (ASTM D1238, mod.) of about 0.5–30 g./10 min., preferably up to about i.e., about 0.5–7; (c) an amorphous copolymer of alpha-methyl styrene and vinyl toluene, having a ring and ball softening point of at least about 185° F., and up to about 230° F., and having a molecular weight of about 1,000–1,400 by osmometry; and (d) a hydrocarbon polymer, compatible with petroleum waxes and containing carboxyl groups. A most effective example of such hydrocarbon polymers is partially oxidized polethylene of about 750–20,000 molecular weight, preferably about 1,000–3,000, and an acid number of at least about 2, and preferably about 5–20.

Preparation of the EVA copolymers is described in U.S. Pat. No. 2,200,429 and these products are commercially available. At least four examples of ethylene-vinyl acetate (EVA) copolymers suitable for use in this invention are commercially available, i.e., Elvax 260, EVA 508 and EV–23 and EV–21, EVA copolymers of about 0.5–7 melt index are preferred to higher melt index material because, for a given blend viscosity, the former provides better high-temperature seal, better flexibility and lesser amounts are required. Amorphous copolymers of alpha-methyl styrene and vinyl toluene suitable for use in this invention, having a molecular weight range of about 1,000 to 1,400, and a ring and ball softening point of about 185° to 230° F., can be made as described in U.S. Pat. No. 3,000,868 and one is commercially available as "Piccotex 100" which has a molecular weight (osmometry) of about 1,140 and a ring and ball softening point of about 202° F. These copolymers contain about 25–35 percent weight of alpha methyl styrene and about 65–75 percent weight vinyl toluene and have ring and ball softening points of about 185° to 230° F.

The preparation of oxidized polyethylene materials which can be employed in formulating compositions of this invention is described in U.S. Pat. No. 3,060,163 to Erchak and the products are commercially available as, e.g. AC–629 and "Epolene E–10.38 The oxidized polyethylene employed in our composition can be oxidized through reaction with oxygen sufficiently to introduce carboxylic groups. The resins are also described in U.S. Pat. No. 3,117,101 to Moyer. These polymers have average molecular weights of at least about 750, preferably at least about 2,000, and are essentially of polymethylenic configuration. The oxidized product is wax-compatible, i.e., dispersible, miscible or soluble in wax; however, it is preferred that the molecular weight not materially exceed about 20,000, In order to realize full benefit, the degree of oxidation should be sufficient that at least about one carboxylic group is introduced for each 15 average molecules, and preferably for each 1–3 average molecules. However, benefits may be obtained from lesser degrees of carboxylic group content. A polyethylene resin of the above degree of oxidation substantially retains its rigidity and hardness. A preferred oxidized polyethylene resin will exhibit a needle penetration (100 g./5 sec./77° F.) of about 0.4 mm. or less and have an acid number of about 5 to 20.

The components of the compositions of the present invention can be present in the following approximate weight percentages:

| | General Wt. % | Preferred Wt. % |
|---|---|---|
| 150°+M.P. Paraffin wax | 50–85 | 65–80 |
| Ethylene-vinyl acetate (EVA) copolymer | 7–20 | 9–12 |
| Amorphous copolymer of alpha-methyl styrene and vinyl toluene | 7–25 | 10–20 |
| Oxidized polyethylene | 0.5–5 | 0.8–3 |

Some further modifications in composition may be advantageous while remaining within the weight percent range of the specified components, such as including additional oxidation inhibitors. Also, a minor amount (e.g., up to about 20 percent) of the paraffinic wax may be replaced by a relatively hard coating grade microcrystalline wax having a needle penetration of 110° F. (D–1321) of about 100 dmm. max., preferably less than about 60, and a petrolatum melting point of about 160° F. min., preferably about 170° F. min. (D–127), in order to enhance room temperature laminating or sealing strength. Incorporation of a small amount (e.g., 1–3 percent) of butyl rubber or other elastomer additive may be of value, such as for modifying seal performance at room temperature or at low temperature on a particular substrate, or increasing the coefficient of friction of the film.

It is to be understood that the four essential components in the novel wax compositions of this invention can be adjusted within the proportions herein noted to give the most suitable composition required for the particular use. However, the novelty and utility of this invention depend on having all of the four components present within the ranges herein designated. Thus, the use of the alpha-methyl styrene-vinyl toluene resins has been found essential to get satisfactory speed of substrate wetting and application flowout, combined with high-temperature sealing strength in cellulosic substrates. Presence of the oxidized polyethylene is essential to good sealing performance, including high-temperature performance, on most substrates including the more dense cellulosic types.

The present invention will be further described by the following specific examples. Throughout the specification, unless indicated otherwise, the percentages are by weight.

The sealing or laminating strength of various specimens was determined at elevated temperature by noting that time required for a given weight or load to deseal a specimen maintained in an oven at a prescribed temperature, 120° F. for the data reported here. Specimens were prepared by coating the composition on one side of a suitable substrate, usually at a coating weight of 15–17 lbs./3,000 sq. ft. ream, and sealing this coating to various other substrates on a Sentinel sealer. The substrate originally coated with the hot-melt was then secured flat against a flat panel by means of double-faced masking tape. This panel was then secured in an oven in a horizontal position and a weighted clamp affixed to a free end of the second sheet material which has been sealed to the original coating. In this fashion, the weighted clamp exerted a downward peeling force on the horizontal seal specimen above. As a standard test condition, the time recorded was the time in minutes required for a 30-gram load to delaminate a 1×1-inch area which had been sealed on a Sentinel sealer at 225° F. for 1 second at 4 p.s.i.g. pressure. The event was observed through a window in the oven. Normally, the test was stopped after 12 minutes and if the specimen was not yet fully desealed an estimate was made of the probable failure time based on the percentage of total area desealed at 12 minutes. These estimated numbers are given in parentheses in the tables below. In the data reported here, a hot-melt coating was applied either to glassine paper or to a 25 pounds bleached sulfite paper and this was sealed to the sized surface of a heavily surface (starch) coated 60-pound sheet. Since, in the test, the 60-pound sheet was peeled at a moderate angle away from the lighter sheet rather than vice versa, the test did not indicate the degree of adhesion at the interface of the lighter sheet, but did provide a measure of any cohesive weakness in the laminant and also any adhesive weakness at the starch coated interface of the 60-pound paper. The results verified that for the kind of laminants or sealable coatings under study here, it made no difference whether the original coating was applied to paper or glassine, and data from each technique is included here.

The invention is illustrated by results of tests carried out using as laminants the compositions described in table I. Laminant 1 is an example of the preferred type. Laminant 2 illustrates the loss of high-temperature strength when the oxidized polyethylene is omitted. Substitution of a similar, but unoxidized grade of polyethylene is not suitable, as in laminant 3, Laminants 4 and 5 illustrate the unsuitability of other types of amorphous resins of comparable or higher softening point. Laminants 6, 7 and 9 are variations illustrating that a small amount of relatively hard microwax or butyl rubber can be added, if desired, while retaining a significant degree of high-temperature laminating strength. Laminant 8 illustrates that even a relatively hard, high-melting microwax, liberally fortified with EVA copolymer, oxidized polyethylene, and butyl rubber, such that its viscosity is over 1,000 cps., will not give the desired high-temperature strength. Laminant 10 is another example of a preferred composition.

TABLE.—COMPOSITION OF LAMINANTS IN WEIGHT PERCENT

| Laminant No. | 1 | 2 | 3 | 4 | 5 | 6 | 7 | 8 | 9 | 10 |
|---|---|---|---|---|---|---|---|---|---|---|
| 153° F. M.P., paraffinic wax | 73.5 | 74 | 72.5 | 72.5 | 72.5 | 69 | 60 | | 60.8 | 72.5 |
| EVA copolymer: | | | | | | | | | | |
| A | 10 | 11 | 11 | 11 | 11 | | | | | 11 |
| B | | | | | | 11.2 | | | 8.9 | |
| C | | | | | | | 9 | 12 | | |
| Oxidized polyethylene | 1.5 | | | 1.5 | 1.5 | 1.4 | 1 | 1.5 | 0.9 | 1.5 |
| Polyethylene N | | | 1.5 | | | | | | | |
| Terpene resin, 115° C. S.P | | | | 15 | | | | | | |
| Rosin ester, 105° C. S.P | | | | | 15 | | | | | |
| "Piccotex 100" resin | 15 | 15 | 15 | | | 13 | 15 | | 13 | 15 |
| Microwax A | | | | | | 5.4 | 15 | 83.8 | 14.8 | |
| Butyl rubber | | | | | | | | 2.7 | 1.6 | |
| Viscosity of laminant, cps. at 250° F | 125 | 140 | 150 | 150 | 150 | 115 | 150 | 1,125 | 150 | 150 |
| Lamination strength, minutes at 125° F | 12+(96) | ½ | ½ | ½ | ½ | 12+(16) | 12+(14) | ¾ | 8 | 12+(96) |

Copolymer A has 1–7 MI, 28% vinyl acetate.
Copolymer B has 15–20 MI, 28% vinyl acetate.
Copolymer C has 1–5 MI, 25% vinyl acetate.
Microwax A is a relatively hard, coating grade microwax of 171° F. M.P., 15 pen. at 77° F. and 45 pen. at 110° F.
Polyethylene N is an unoxidized polyethylene having a molecular weight of about 2,500 mol. wt.
Oxidized polyethylene has a molecular weight of about 2,500 mol. wt.

It is claimed:

1. A wax composition consisting essentially of:
   a. about 50 to 85 weight percent of a paraffinic wax having a melting point of at least about 150° F., a viscosity at 210° F. of at least about 5.7 c.p.s., and a needle penetration at 120° F. of up to about 70 dmm.,
   b. about 7 to 20 weight percent of an ethylene-vinyl acetate copolymer having a vinyl acetate content of about 25–29 weight percent and a melt index of about 0.5–30 g./10 min.,
   c. about 7 to 25 weight percent of an amorphous copolymer of alpha-methyl styrene and vinyl toluene having a ring and ball softening point of about 185° F. to 230° F., and a molecular weight of about 1,000 to 1,400, and
   d. about 0.5 to 5 weight percent oxidized polyethylene of about 750 to 20,000 molecular weight and an acid number of at least about 2.

2. The wax composition of claim 1 wherein the paraffinic wax is about 65 to 80 weight percent, the ethylene-vinyl acetate copolymer is about 9 to 12 weight percent, the amorphous copolymer of alpha-methyl styrene and vinyl toluene is about 10 to 20 weight percent, and the oxidized polyethylene is about 0.8 to 3 weight percent.

3. The wax composition of claim 2 wherein the paraffinic wax has a needle penetration at 120° F. of up to about 50 dmm., the ethylene-vinyl acetate copolymer has a melt index of about 0.5 to 7 g./10 min., and the oxidized poly ethylene is about 1,000 to 3,000 molecular weight and an acid number of about 5 to 12.

4. The wax composition of claim 1 containing up to about 20 weight percent of microcrystalline wax having a petrolatum melting point of at least about 160° F. and a penetration at 110° F. of up to about 100 dmm.

5. A cellulosic substrate coated with the wax composition of claim 1.

6. A cellulosic substrate coated with the wax composition of claim 2.

7. A cellulosic substrate coated with the wax composition of claim 3.

8. A cellulosic substrate coated with the wax composition of claim 4.

9. A laminated product of a plurality of cellulosic substrates bonded together with the wax composition of claim 1 as a laminant.

10. A laminated product of a plurality of cellulosic substrates bonded together with the wax composition of claim 2 as a laminant.

11. A laminated product of a plurality of cellulosic substrates bonded together with the wax composition of claim 3 as a laminant.

12. A laminated product of a plurality of cellulosic substrates bonded together with the wax composition of claim 4 as a laminant.

* * * * *